United States Patent

[11] 3,597,549

[72] Inventors Wayne D. Farmer
Madison Township, Middlesex County;
Edmunde E. Newhall, Rumson, both of,
N.J.

[21] Appl. No. 842,581
[22] Filed July 17, 1969
[45] Patented Aug. 3, 1971

[73] Assignee Bell Telephone Laboratories, Incorporated
Murray Hill, N.J.

[54] HIGH SPEED DATA COMMUNICATION SYSTEM
19 Claims, 8 Drawing Figs.

[52] U.S. Cl. .......... 179/15 AL, 178/2 D, 325/53
[51] Int. Cl. .......... H04j 3/08
[50] Field of Search .......... 178/2 D; 179/15 AL, 15 BA, 2 DP; 325/53—55

[56] References Cited
UNITED STATES PATENTS
3,456,242 7/1969 Lubkin .......... 179/15 AL

*Primary Examiner*—Ralph D. Blakeslee
*Attorneys*—R. J. Guenther and Kenneth B. Hamlin

ABSTRACT: A common continuously closed loop transmission line links all stations in a multistation network, and continuous bipolar bit signal is maintained thereon for providing station clock recovery. A station transmits by overwriting the loop signal with the station outgoing message, and an end-of-message code on the loop is followed by a binary ONE bit. A station wishing to transmit, and recognizing the latter code, converts the ONE to a ZERO to signify to down-line stations that it has seized control; and it immediately transmits its message followed by the end-of-message code plus a ONE. Control of the loop is thus similarly passed around the loop to utilize every time slot as long as any station wants to transmit.

INVENTORS W. D. FARMER
E. E. NEWHALL
BY
Charles Scott Phelan
ATTORNEY

HIGH SPEED DATA COMMUNICATION SYSTEM

BACKGROUND OF THE Invention

1. Field of the Invention

This invention relates to multistation communication systems for use in telegraph, teletypewriter, and data processing and transmission systems.

2. Description of the Prior Art

There has been considerable activity in multistation communication in telegraph, teletypewriter, and data processing and transmission systems. In order to accommodate selectable combinations of the stations in the system, common facilities such as a central switching facility, a double ended conference-type bus, or a looped conference bus have been employed. The latter arrangement is often preferred because it presents the possibility for minimum wiring between stations without the necessity for a switching central. This is an important consideration in any installation, but is particularly important where the stations which are to share a common facility happen to be comparatively widely separated in a geographical sense.

Any time that multiple stations share a common facility, it is necessary to provide for access to that facility without conflict among the stations, to avoid arrangements which might cause ringing on the common facility, and to maintain some sort of station-to-station synchronization during transmission. In order to realize there functions a substantial amount of time is usually consumed at the expense of time actually available for accommodating the real information transmission among stations. A number of examples well known in the art illustrate the point.

In time division multiplex systems dedicated time slots are allotted to each of the stations, but they are not used by any station unless the proprietary station is involved in the transmission. Even in asynchronous systems at least one time slot per character is generally allowed for resynchronizing to be sure that transmitting and receiving equipments are operating in step with one another. Furthermore, in all multistation transmission systems a station which is in control of the common facilities at a particular time preliminarily interrogates its addressee stations to determine their condition of readiness to receive; and, while such preliminary interchanges are taking place, all other stations must stand idle even though the answer back from addressees may not be immediate.

Efforts have been made to reduce the time necessary for determining common facility control when two or more stations seek control at the same time, but a time-consuming priority determination usually must be made while all other stations stand idle.

Synchronized multistation systems are known in the art, and some of them employ a closed transmission loop, but such a loop is employed only when no station is transmitting. As soon as a station seizes control for transmission it opens the common transmission loop in order to assert this control. In so doing, synchronism with other stations and intermediate repeaters is temporarily lost, and a certain amount of time is required to reestablish coordinated operation. This latter aspect is of particular significance for systems in which high speed pulse-type transmission is to be carried out over ordinary telephone lines with a bandwidth capability much less than the desired pulse repetition rate because reduced spacing of regenerative repeaters along the loop is required.

It is, therefore, one object of the invention to reduce the proportion of control time in relation to information transmission time in multistation communication systems.

It is another object to improve techniques for passing control among a plurality of stations on a common communication bus.

Statement of the Invention

The foregoing and other subjects of the invention are realized in an illustrative embodiment thereof in which a plurality of stations on a continuously closed communication loop pass loop control from station to station in sequence around the loop by modification of a control code which follows message transmission by a preceding station on the loop.

It is one feature of the invention that all stations and repeaters on the loop are maintained in continuous synchronism because they always have indication of the loop phase and frequency available from the continuously closed loop.

It is another feature that the station in control transmits its message information and then relinquishes control to a succeeding station on the loop without awaiting response to its messages.

It is a further feature that control is passed from station to station by simply modifying an operation code on the common transmission loop to indicate seizure of control and immediately transmitting available messages or queries. Thus, no action is required of a station that is not seeking control.

Still another feature of the invention is that the common transmission loop is operated at a bit rate which is at least equal to the bit rate of the fastest station which can transmit to that loop.

An additional feature is that one of the stations is operated as a supervisory station for linking the common transmission loop to one or more other similar loops for signal communication. The supervisory station is also able to exert overriding control of the common loop when loop operative or administrative troubles develop.

A still further feature of the invention is that operation in the mode outlined imposes no requirement for a certain bit rate of station operation or for message size.

BRIEF DESCRIPTION OF THE DRAWING

A more complete understanding of the invention and its various features, objects, and advantages may be obtained from the following detailed description when taken in connection with the appended claims and the attached drawing in which:

DETAILED DESCRIPTION

Figure 1:
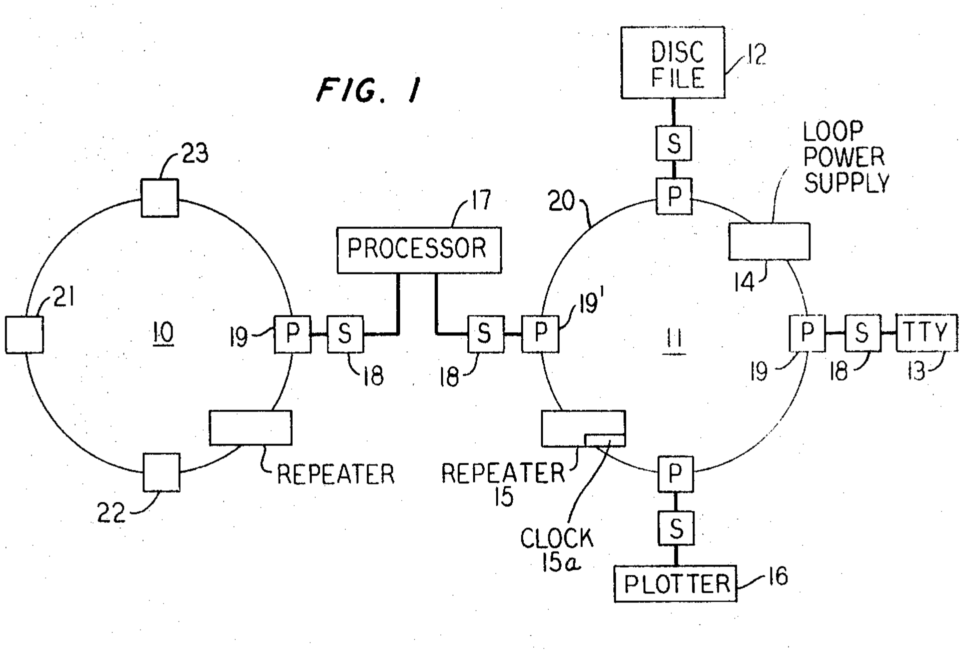
FIG. 1 is a simplified block and line diagram of the multistation communication system utilizing the present invention; operation.

The multistation communication system shown in FIG. 1 includes two multistation loops 10 and 11 each of which is shown, for purposes of illustration, as embracing four stations. The stations are advantageously of different types with different characteristic information transmission bit rates, different message lengths, and different, aperiodic, traffic requirements for access to the transmission facility. For purposes of illustration, the loop 11 provides data communication, by pulse-type signals, among a memory disk file 12, a teletypewriter 13, a graphics system plotter 16, and a central data processor 17. Each of the aforementioned equipments is part of a station including a secondary network 18 and a primary network 19 for providing interface functions to couple the respective stations to a common transmission loop circuit 20 which serves all of the station. Loop 11 also includes a power supply 14 for loop circuit 20, all primary networks 19, and a repeater 15, which repeater schematically represents all regenerative repeaters utilized between stations on loop circuit 20. Such repeaters are employed to regenerate pulse-type signals on the circuit to overcome signal distortion produced by the fact that the signals advantageously have a pulse repetition rate of 6.3 megahertz in one embodiment while the circuit 20 is an ordinary telephone circuit with a transmission bandwidth of less than 3 kilohertz. In certain short-haul applications the use of more frequent repeatering has been found to be economically preferred over installation of appropriate high bandwidth transmission circuits. The repeaters include a clock recovery circuit arrangement 15*a* similar to that which will be described for primary networks in connection with FIG. 4, and the repeaters are powered in the same fashion as will be described for the primary networks.

The processor 17 functions as a supervisory station on the loop 11 for resolving technical and administrative problems of communication on that loop. To this end, a modified primary network 19' is utilized by the processor as will be described in connection with FIG. 4A. The processor also initiates loop operation in an orderly manner as will be described, and is advantageously capable of providing dynamic traffic level surveillance of the loop 11 to prevent access thereto by such a large number of stations that loop control by an individual station would be too infrequently available. Processor 17 also provides a communication link from the loop 11 to one or more additional loops such as the loop 10 and its stations 21, 22, and 23, each of which includes pulse-type communication equipment and primary and secondary networks. In the loop 10 the processor may function as either an ordinary station or a supervisory station. Since the processor has random access memory associated therewith and included but not specifically shown in the schematic representation in FIG. 1, it also advantageously has a capability of providing operation code translation service for the various stations on any loop to which it is coupled in the event that two or more is the stations on that loop are designed to operate in response to dissimilar operation codes. However, in a preferred embodiment station secondary networks 18 are advantageously provided with individual memories for performing such translation functions as will be hereinafter indicated in connection with FIG. 5. ground series intermediate transistor. by The primary network 19 within each station is operated at the common loop circuit 20 pulse transmission rate and regenerates information signal bits on the loop. The primary network is also adapted, as will be described in connection with FIG. 4, to allow its associated station transmitter to overwrite signal bits on the common loop circuit 20 when such station has seized loop control.

The station secondary network 18 for each station operates partially at the loop pulse rate and partially at the individual bit rate of the station's data communication equipment and includes appropriate signal buffer storage to make the two bit rates compatible for the anticipated station message size and traffic level.

Figure 2:
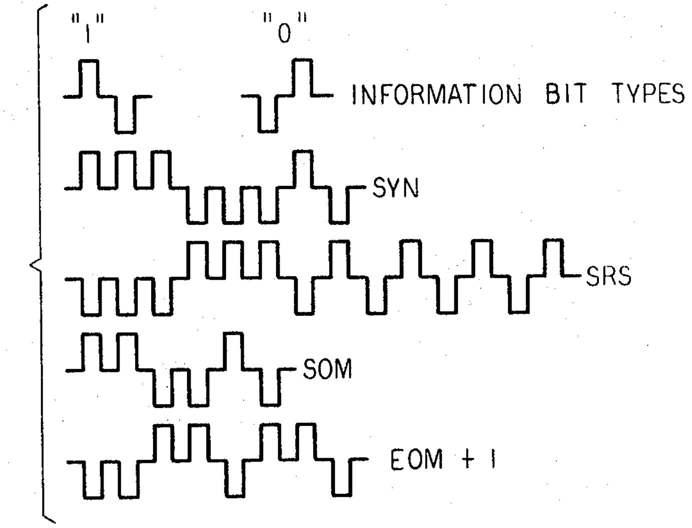
FIG. 2 is a group of pulse train diagrams illustrating the types of signals employed for information signal and control signal operation.

Fig. 2 illustrates information signal and control signal waveforms utilized in the transmission system of FIG. 1. A bipolar bit signal, with sequentially spaced positive and negative pulses to represent a binary ONE and sequentially spaced negative and positive pulses to represent a binary ZERO, is employed for information bit transmission. Such transmission includes the real data which is sought to be conveyed to another station as distinguished from system operation codes, control codes, and address headers for messages. The control code signals are presented by bipolar variations, as is now known in the art; and several particular control codes utilized in the present invention are shown in FIG. 2.

Initially, a train of ZEROS is applied to the circuit 20 by primary network 19' as will be described, and the various station primary networks 19 recirculate those ZEROS continuously around the loop when there is no data or control signal transmission. Each of the stations responds to this continuous bit transmission on the loop to recover the clock frequency rate of transmission for the loop in any appropriate manner, one form of which will be shown in connection with FIG. 2. The illustrated clock recovery form is based on bipolar signal rectification to produce a pulse rate, which is twice the information bit rate. When the processor 17, under control of its system program, initiates loop operation, it applies to the loop a synchronizing (SYN) code shown in FIG. 2 to permit all stations to lock in on the same time zero for a bit interval. The SYN code includes three spaced positive pulses followed by three spaced negative pulses and a binary ONE bit. The latter bit is added to the code to prevent the occurrence of a decoding ambiguity in the event that a SYN code should be followed by a service request scan (SRS) code. Each station on the loop is able to detect the SYN code pulse pattern and utilize the trailing edge of the third negative pulse of that pattern as the indication of time zero in a bit interval. The SYN code is also employed by the supervisory station on a loop to silence all stations for exercising administrative control, e.g., in the situation wherein it is found that one station is dominating loop utilization by excessively long transmissions. A supervisory station has the capability of breaking into loop transmission to send the SYN code at any time. It will be apparent from the subsequent discussion of FIGS. 5A and 5B that such code causes each station to reset its input and output control shift registers and thereby lose any loop control it then held.

Once the stations on a loop have achieved clock recovery in response to received bipolar signal bits and bit phase recovery in response to the SYN code, processor 17 supplies the SRS code to establish multistation access to the loop at a level such that the loop transmission bit rate is at least as large as the summation of the longtime average bit rates of transmission of all stations on the loop. The SRS code includes three spaced negative pulses followed by three spaced positive pulses and further followed by a delay bit period and plural dedicated bit intervals, one dedicated to each of the ordinary stations in the loop. Each dedicated bit interval includes a binary ZERO. Thus, in FIG. 2, the basic SRS code bipolar variation is followed by four ZEROS, the last three of which are dedicated, respectively, to the disk file 12, the teletypewriter 13, and the plotter 16 of the other three stations in the loop 11. When this code appears on the loop circuit 20, each station detecting the code and seeking access to the circuit 20 for purposes of transmission converts the ZERO in its dedicated interval to a ONE to indicate that fact to the processor 17.

The processor 17 contains in memory information as to the bit rate, buffer capacity, massage size, and traffic characteristics for each of the stations. It is advantageously programmed to relate the information represented by dedicated ZEROS that have been converted to ONES to the stored station characteristic data. Upon receiving back the SRS code after transmission around the loop, processor 17 determines whether or not stations can secure loop control frequency enough to avoid station buffer overflow. To the extent that safe transmission is possible, processor 17 then sends out a message in the general format illustrated in FIG. 3 advising the stations seeking control that access is granted.

Figure 3:
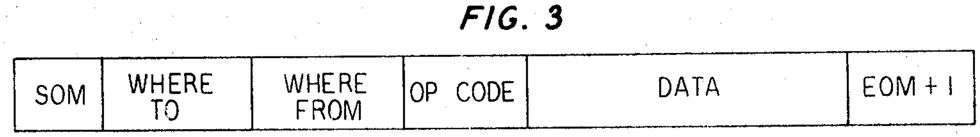
FIG. 3 is a schematic diagram of a typical message format.

In the format of FIG. 3, a message is initiated by a start-of-message (SOM) code which is shown in FIG. 2 to comprise two spaced positive pulses and two spaced negative pulses followed by a binary ONE to prevent detection ambiguity. Individual station address codes are included in the WHERE-TO part of the massage format which, for a loop of the limited size illustrated in FIG. 1, comprises two address bits per station. The next item in the message format is a WHERE-FROM code of two bits indicating the originating station, i.e., processor 17 at this stage of the description. In this case, grant of access, the operation code field of the message format includes a 4 bit code to tell stations to look in the date field for an expanded code; and the data field includes an access grant code, not shown, which advises the addressed stations that they can have access to the loop circuit 20. Such device takes the form of a decoded signal which enables station apparatus that overwrites the ONE in EOM+1. The message is terminated by the end-ofemessage code (EOM+1) which is shown in FIG. 2 as including two negative pulses, two positive pulses, a binary ZERO to prevent detection ambiguity, and a binary ONE.

Any of the stations which were granted access to the loop circuit 20 by the message just described, and which still desire access thereto can now seize control upon receipt of the EOM+1 code. The first station on the loop to receive the latter code and which is seeking control changes the final binary ONE in that code to a ZERO, thereby signifying to subsequent stations that it has seized control and preventing those stations from seizing control. Thus, for clockwise transmission in the loop 11, disk file 12 has the first chance to seize control. If it seizes control, no other station sees an EOM+1 code; they all see only EOM+0. The disk file immediately applies its SOM code and subsequent message to the transmission circuit 20 following the final ZERO that it has imposed on the EOM+1 code from processor 17. At the end of the message from the disk file 12, the latter regenerates and transmits the EOM+1 code indicating to downline stations that it has relinquished control. If a station does not need to transmit, it simply takes no action and allows the EOM+1 code to pass by unchanged. When the addressee of the message from disk file 12 realizes control of loop circuit 20, it applies the appropriate response message to the loop circuit and relinquishes control to stations subsequent to it. Control of the loop circuit is thus continuously passed around the loop without constant supervisory intervention of processor 17 until such time as there are no more messages to be transmitted in the loop 11, or until some trouble develops, or until a station in the loop 11 needs to transmit to a station in the loop 10.

Figure 4:
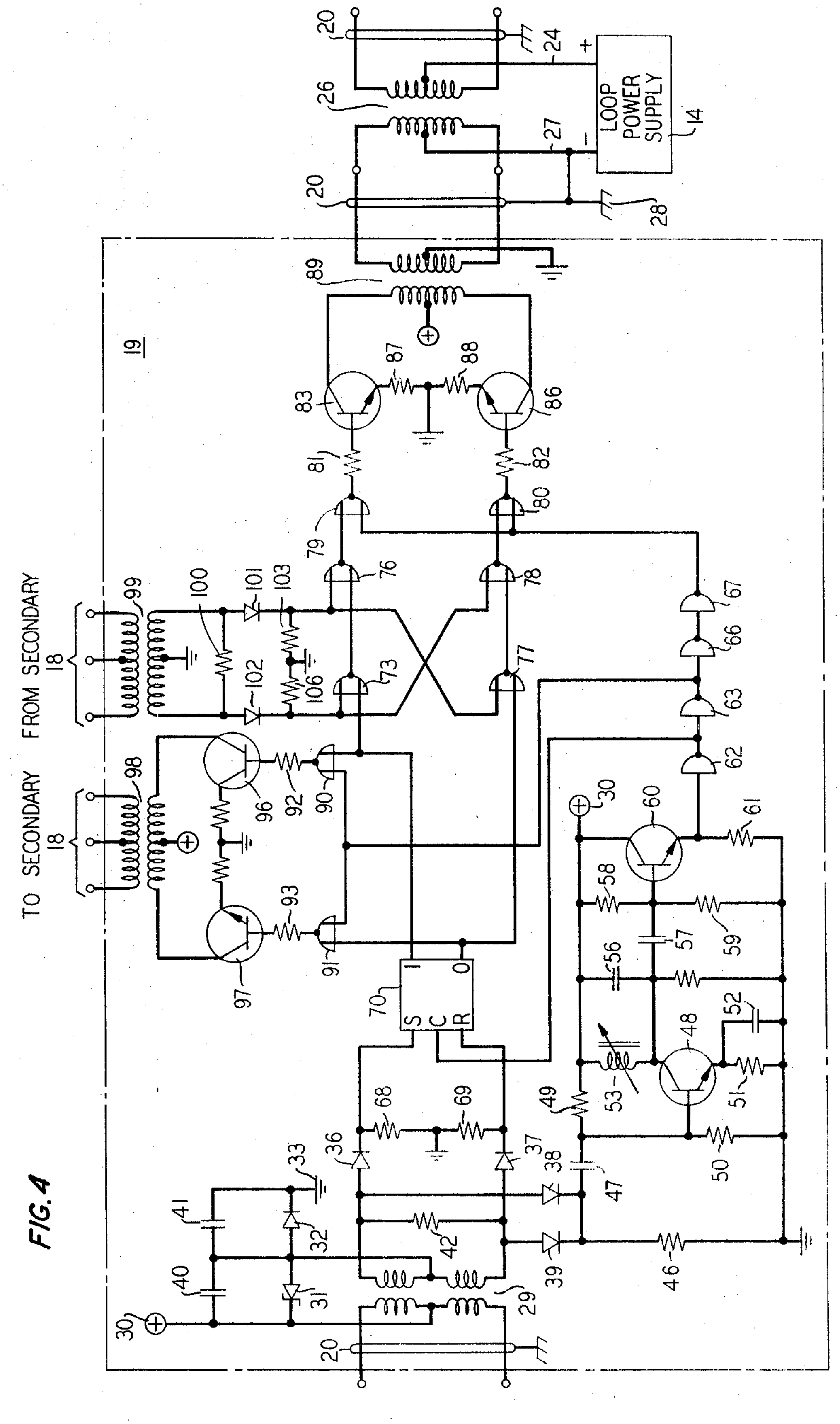
FIG. 4 is a schematic diagram of a primary network utilized in the system of FIG. 1.

FIG. 4 illustrates additional schematic detail for a primary network 19 of the type utilized in the system of FIG. 1. The two conductors of the transmission loop circuit 20 are shown for loop signals entering the primary network at the left and exiting at the right in FIG. 4. Similarly, two sets of leads for coupling the primary network to the input of its associated secondary network 18 and the output of the same network are shown in the upper portion of FIG. 4.

The loop power supply 14 is shown in FIG. 4 to illustrate the manner of its coupling to the loop to supply operating potential to all primary networks of the entire loop 11. The positive output lead 24 is coupled to the center tap of the secondary winding on a transformer 26 in the loop circuit 20. A center tap on the primary winding of the same transformer is coupled to the negative terminal of power supply 14 by way of a lead 27 which is also connected to the overall system ground as represented by the flat ground symbol 28. Since the loop circuit 20 operates advantageously at a pulse frequency of 6.3 megacycles, shielded cable is provided for that circuit and the shielding is connected to the system ground. Thus, output current from the power supply 14 flows around the loop circuit 20 in a longitudinal manner through the two conductors of that circuit. This is the same clockwise direction previously noted for signal transmission around the loop.

An input transformer 29 at each primary network has center tapped primary and secondary windings, and operating potential for the individual primary network of a station is derived between those center taps. Thus, the center tap on the primary winding of transformer 29 is connected to a positive terminal shown as a circled plus sign 30 which schematically represents the positive potential for the primary network and is connected to all similarly designated points in the network of FIG. 4. The terminal 30 is connected through a reverse breakdown diode 31 and a conventional diode 32 in series to station ground which is schematically represented by the triangular ground symbol 33. Breakdown diode 31 establishes an operating potential of about 4.3 volts for the primary network. Diode 32 establishes a small positive potential to assure turn-on bias for a first pair of rectifying diodes 36, 37 in the signal path and a second pair of rectifying diodes 38, 39 in the clock recovery path for the primary network. Two capacitors 40 and 41 are connected in parallel with diodes 31 and 32, respectively, for providing alternating current bypass for the operating potential source. A resistor 42 is connected across the end terminal of the secondary winding for transformer 29 and has a resistance which is fixed at a level to match the primary network input impedance to the characteristic impedance of the loop circuit 20.

Rectifying diodes 38 and 39 connect the respective end terminals of the secondary winding on transformer 29 to a terminal 43 of a resistor 46 which is connected at the other end thereof to station ground. Rectified bipolar signal pulses are coupled through a capacitor 47 to a base electrode of a transistor 48 which is connected in a tuned, common-emitter, amplifier circuit. Nominal base operating potential is established from the station positive voltage 30 by potential divider resistors 49 and 50 connected in series to ground and having their series intermediate terminal connected to the base electrode of the transistor. An emitter resistor 51 supplies appropriate self-bias for the amplifier operation and by pass capacitor 52 prevents signal frequency modification of that bias in the usual manner.

A parallel tuned circuit including an adjustable, slug-tuned, coil 53 and a capacitor 56 is connected in series in the collector circuit of transistor 48 to provide an output clock recovery signal at twice the information bit rate of signals on the loop circuit 20. The flywheel effect of the aforementioned tuned circuit maintains the recovered clock frequency stable. A capacitor 57 couples a recovered clock frequency through an intermediate tap of biasing potential divider resistors 58 and 59 to the base electrode of an emitter-follower connected transistor 60. Emitter resistor 61 connected to transistor 60 develops the clock potential for actuating a chain of single-input, inverting, NAND gates 62, 63, 66, and 67. These gates are operated from station operating potential by connections not shown and are of any suitable type which advantageously produces a low output signal in response to a coincidence of high input signals and a high output signal in response to all other input signals. Thus, in the single-input format illustrated for gates such as the gate 62, the inverting aspect of such gates is employed to provide clock pulses of different desired polarities for operating the various circuits of the primary network. It will be obvious to those skilled in the art that the gates 63 and 67 both provide outputs of the same polarity as that appearing at the emitter electrode of a transistor 60 and can be omitted in favor of direct connections to that electrode if sufficient operating current is available there for providing the necessary fan-out. The output of gate 62 is of opposite polarity with respect to the outputs of gates 63 and 67.

Two resistors 68 and 69 are connected in series between the cathode sides of diodes 36 and 37 and have an intermediate terminal connected to station ground for developing rectified signal pulses at the set and reset inputs of a clocked flip-flop circuit 70. The flip-flop circuit 70 is nonresponsive to signal input variations except in the presence of clock signal applied to the complementing input of the flip-flop circuit from the output of gate 62. Thus, signals from the loop circuit 20 are coupled into the primary network on a double-rail logic basis, and it will be seen that they are carried through the network and to the secondary network associated therewith on the same double-rail logic basis.

Four NOR gates 73, 76, 77, and 78 receive the regenerated signal from the ONE and ZERO outputs of flip-flop circuit 70 and are interconnected to permit overwriting by the output of the associated secondary network as will be subsequently described. The NOR gate produces a high output in response to a coincidence of low inputs and a low output for all other inputs. Outputs from gates 76 and 78 are further coupled through clocked NOR gates 79 and 80, respectively, and two current limiting resistors 81 and 82, respectively, to base electrodes of a pair of common-emitter-connected NPN transistors 83 and 86. Emitter electrodes of the latter transistors are returned to station ground through resistors 87 and 88 while the collector electrodes are connected together through a center tapped primary winding of the primary network output transformer 89. Station positive potential is applied at the center tap of that primary winding for operating the NPN transistors 83 and 86. Information signals from the collector electrodes of transistors 83 and 86 are coupled through output transformer 89 to the loop circuit 20. A center tap on the secondary winding of the latter transformer is also connected to station ground to provide continuity of loop circuit operating current supplied by the loop power supply 14.

Two clocked NOR gates 90 and 91 are enabled by clock signals at the output of gate 63 to couple information signals from the output of flip-flop circuit 70 to the input of the associated secondary network 18. Outputs of the gates 90 and 91 are applied through current limiting resistors 92 and 93, transistors 96 and 97, and a coupling transformer 98 to such secondary network input in the same fashion as the previously noted circuits associated with transistors 83 and 86. However, in this case the center tap on the secondary winding of transformer 98 is utilized in conjunction with one of the transformer secondary winding end terminals to supply bit rate signals on a single-rail logic basis to the secondary network while signals appearing between the two end terminals of the secondary winding are utilized for secondary network clock recovery. Thus, each secondary network continuously monitors signals on the loop circuit 20, recovers secondary network clock from those signals, and utilizes the signals in an information sense as will be subsequently described in connection with FIGS. 5A and 5B.

Output from the secondary network is coupled back to the primary network through a transformer 99 having a center tapped primary winding, which center tap is connected to a secondary network power supply terminal, not shown, for providing a current return path for double-rail logic bipolar output signals form the secondary network. The secondary winding is also provided with a center tap that is connected to station ground for the primary network. A resistor 100 is connected across that primary winding for impedance matching purposes and rectifying diodes 101 and 102 cooperate with resistors 103 and 106 for coupling the double-rail signals to inputs of gates 73 and 76 through 78 in much the same manner as previously described for coupling signals from transformer to flip-flop 70.

Signals from diode 102 are applied to ages 73 and 78, and signals from diode 101 are applied to gates 76 and 77. The result of this manner of connection is that, absent output signals from the associated secondary network, the gates 73 and 76 through 78 are continuously enabled by the station ground connection between resistors 103 and 106 to couple signals from the outputs of flip-flop circuit 70 to the clocked gates 79 and 80 without change. However, if the secondary network is itself supplying signals, these exercise overwriting control of the gates 73 and 76 through 78 so that the outputs of gates 76 and 78 comprise a repetition of the double-rail output of diodes 102 and 101, regardless of the state of flip-flop circuit 70. Thus, if the output of diode 102 is high and the output of diode 101 is low, and flip-flop circuit 70 is reset, the output of gate 73 is the complement of the output of diode 102 and the output of gate 76 is the true form thereof. In similar fashion the output of gate 77 is the true form of the output of diode 101 when flip-flop circuit 70 is reset, and the gate 78 then produces the complementary form of the output from the diode 102. Thus, the secondary network output overwrites the output of flip-flop 70 for controlling the clocked gates 79 and 80. However, regardless of whether through signal transmission, overwriting, or idling is going on, the loop circuit 20 is always closed and some form of bipolar bit signal is always available for clock recovery in each station. The manner in which the secondary network cooperates with the primary network to produce the aforementioned overwriting is hereinafter described in connection with FIGS. 5A and 5B.

Figure 4A:
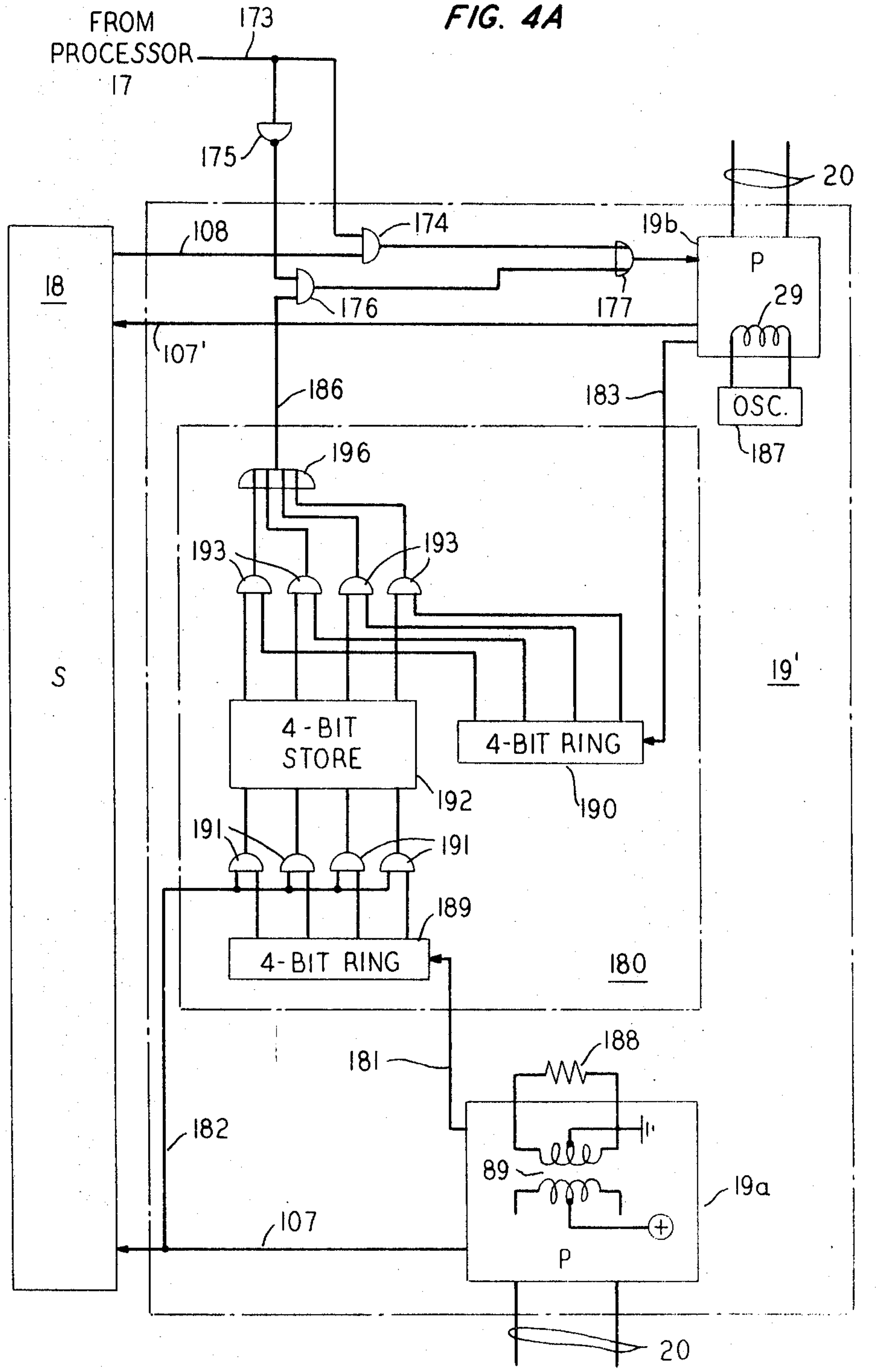
FIG. 4A is a schematic diagram of a modified primary network arrangement.

Before considering the secondary network, however, the modified primary network 19' will be described in connection with FIG. 4A. The primary network 19' includes two primary networks 19*a* and 19*b*, as shown in FIG. 4, which are interconnected for continuity of loop transmission through a digital delay pad 180. Fractional bit interval delay around loop circuit 20 is compensated by pad 180 so that the loop can be held continuously closed for data transmission. Only one delay pad is required for a loop, and it can be located at any point in the loop and be powered from the loop in the fashion as are other loop-powered circuits. A loop oscillation source 187 is also included in the primary network 19' with pad 180. Although network 19' could be employed independently of any station, it is advantageously arranged in FIG. 4A to combine the primary network functions for pad 180, oscillator 187, and the secondary network 18 of processor 17 in FIG. 1. The pad in this embodiment is advantageously powered from the associated network 18 by circuits not shown.

Pad 180 receives from network 19*a* input recovered clock on a circuit 181 and input data from loop circuit 20 on a circuit 182 that is coupled to circuit 107. The latter inputs include the total loop phase delay, the fractional-bit part of which is to be compensated by the pad. Pad 180 also receives in-phase output clock from network 19*b* on a circuit 183 and supplies in-phase loop data to that network on a circuit 186 to be ORed with the station data output of secondary network 18 on circuit 108. The OR function is controlled by a signal on a circuit 173 from processor 17. That signal is applied to a coincidence gate 174 and, after inversion by a gate 175, to another coincidence gate 176. Thus, gates 174 and 176 are actuated on an exclusive-OR basis for coupling the respective circuits 108 and 186 through an OR gate 177 to the overwriting input of primary network 19*b*.

Oscillator 187 continuously supplies a train of bipolar ZEROS to network 19*b* at its transformer 29 (in FIG. 4) primary winding. However, in some applications of loop 11, coil 53 and capacitor 56 (in FIG. 4) in each primary network will provide sufficient bit rate stability so that oscillator 187 can be removed after the loop has been filled by the ZERO train. The train is coupled through the network transformer 98 (in FIG. 4) and a circuit 107' for use by secondary network 18 in outpulsing its output circuits. The clock recovered in network 19*b* is coupled from its gate 63 (in FIG. 4) to the circuit 183. The secondary network 18 receives phase-delayed input data from loop circuit 20 by way of network 19*a* and circuit 107.

Output transformer 89 (in FIG. 4) of primary network 19*a* has its secondary winding connected across a resistor 188 having an impedance equal to the characteristics impedance of loop circuit 20. Network 19*a* receives no overwriting input from a secondary network.

Pad 180 includes two 4-bit ring counters 189 and 190 that are initially started by processor 17 with counter 189 leading counter 190 by two bit intervals so that a race condition cannot be created in the pad. A set of AND gates 191 is scanned in sequence by outputs of counter 189 under control of phase-delayed clock from circuit 181 to couple data bits from circuit 182 to corresponding storage locations on a 4-bit store 192. Counter 190, operating under control of in-phase clock from circuit 183, scans a further set of gates 193 to couple corresponding storage location outputs of store 192 through an OR gate 196, circuit 186 and gates 176 and 177 to primary network 19*b*.

Figure 6:
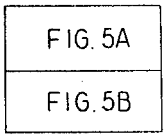
Figure 5A:
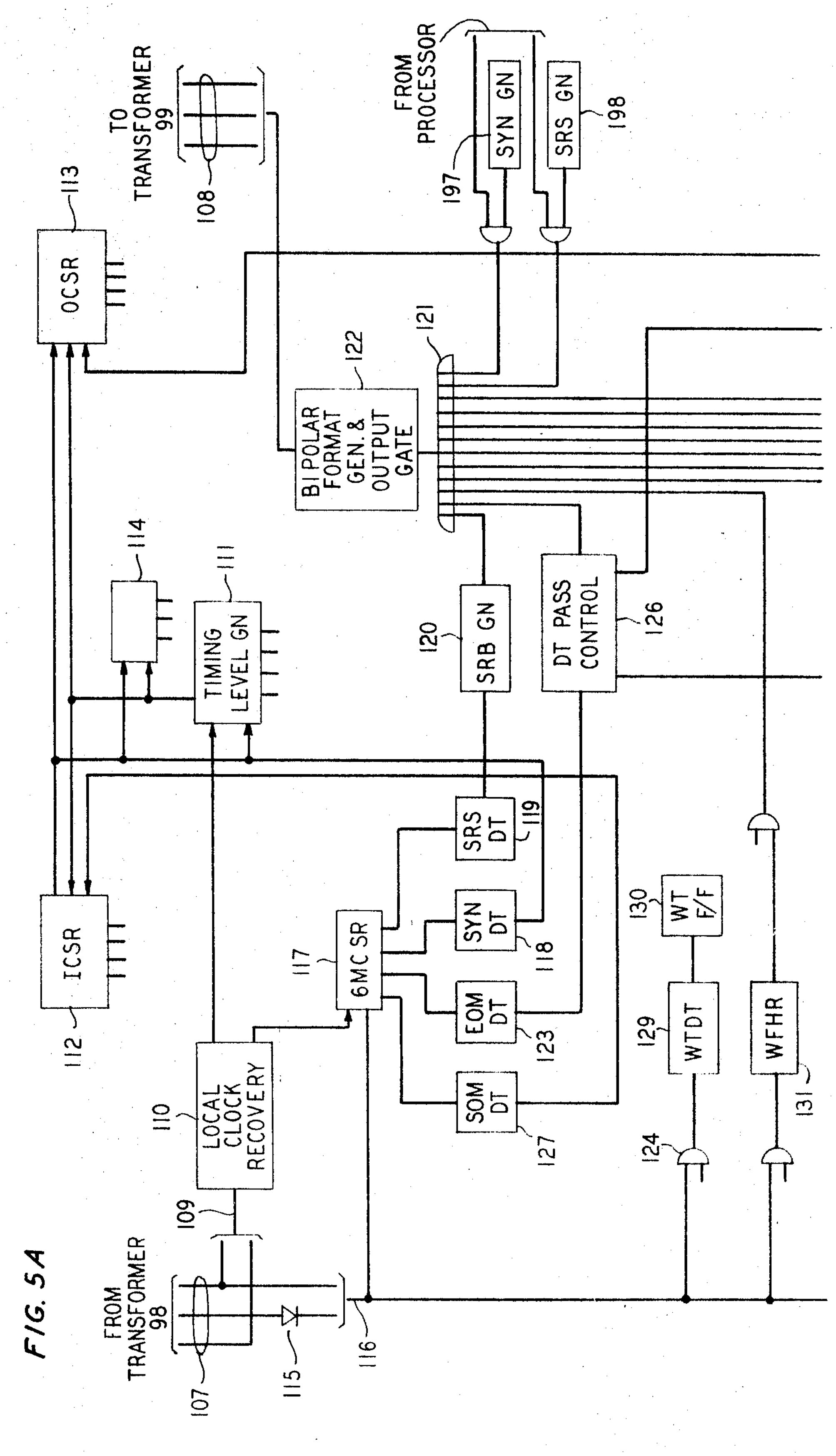
FIGS. 5A and 5B, taken together as in FIG. 6, are a simplified block and line diagram of a secondary network utilized in the system of FIG. 1.
Figure 5B:
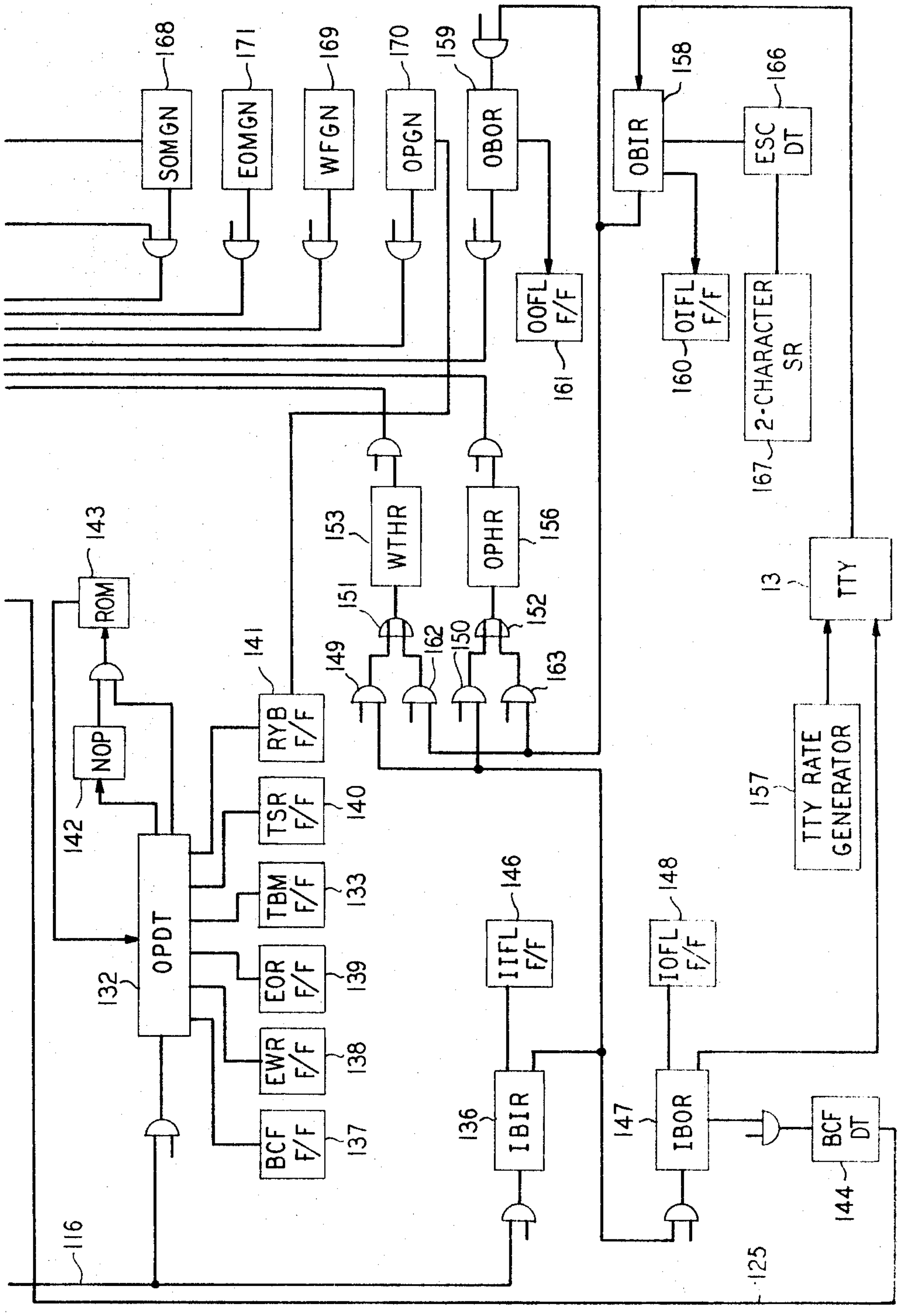

FIGS. 5A and 5B, when placed together as shown in FIG. 6, comprise a simplified block and line diagram of a secondary network 18 for implementing the present invention. Teletypewriter 13 is used in conjunction with the illustrated secondary network for purposes of illustration. The function of the secondary network is to permit station equipment to respond to control signals in the common loop circuit 20 for passing control as hereinbefore outlined and for transmitting and receiving messages in accordance with such control. All of the registers, detectors, flip-flops, gates, and the like in FIGS. 5A and 5B are of the suitable forms which are well known in the art. Only the principle functional interrelationships illustrating the control-passing aspect of the present invention need be outlined here. Secondary network circuits are powered from a source, not shown, at each station and not from source 14.

A circuit 107 receives double-rail logic signals from the transformer 98 in FIG. 4, and a circuit 108 similarly provides bipolar signals in the double-rail logic format to the primary winding of the transformer 99 in FIG. 4. A circuit 109 couples the double-rail logic signals from the circuit 107 to a local clock recovery circuit 110. The latter circuit need comprise only a full wave rectifier since the incoming bipolar data was just retimed in the associated primary network. The recovered clock actuates a timing level generator 111 which is simply a frequency-dividing counter with associated logic for dividing each signal bit period into four timing level, or intervals, which are utilized in conjunction with sequence-controlling signals for fixing the sequence of operations within the secondary network of FIGS. 5A and 5B. Four output leads representing these four bit period subcombinations extend from the bottom of the timing level generator 111 as illustrated in FIG. 5A and are applied to the various circuits of the secondary network in accordance with well-known logic circuit design techniques for carrying out the functions to be described.

In addition, a further output is provided from the timing level generator 111 in coincidence with the triggering of that generator at the beginning of the first of the four timing levels for actuating an input control shift register (ICSR) 112. The latter register responds to each recycling of the timing level generator 111 for initiating a new set of operations in a sequence of sets of such operations for performing the input functions of the secondary network in FIGS. 5A and 5B. A similar output control shift register (OCSR) 113 performs a similar function for the output phase of operation of the secondary network, and a time period generator 114 recurrently produces prolonged gating signals of four, six, and eight timing levels duration for holding a circuit input open to receive signals for one or more corresponding such intervals. Details of such sequencing circuit connections from circuits such as 111—114 are not shown since their arrangement is apparent from the subsequent description of the functions to be performed in support of the control-passing aspect of the invention already described. Also, control inputs to controlled circuits are designated by an AND gate, e.g. gate 124, with a free input lead to receive sequencing signals.

A circuit 116 in FIG. 5A couples the output of transformer 98 in FIG. 4 between the center tap and one end terminal thereof for coupling signal pulses on a single-rail logic basis to the various remaining circuits of the secondary network. A diode 115 in the center tap lead assures a single polarity of pulses in circuit 116. A shift register 6MCSR 117 examines the single-rail logic input pulses in every bit time to determine by virtue of associated coincident detection logic whether or not one of four control codes is present. These are the four control codes which have already been described in connection with FIG. 2.

The output of the SYN code detector 118 is applied to reset the timing level generator 111, the registers 112 and 113, and the period generator 114. An SRS detector 119 responds to the detection of the SRS code by actuating an SRB generator 120, which had been previously enabled, when station power was turned on, by a "power on" detecting circuit, not shown, to couple a ready-to-begin-transmission signal through an OR gate 121 to a bipolar format generator 122. The latter circuit converts the single rail signal to double rail bipolar format and applies it to the the circuit 108 for overwriting the second dedicated ZERO in the SRS code of FIG. 2 to a binary ONE for indicating that the teletypewriter station 13, the second station from processor 17, desires service.

An end-of-message detector 123 detects the presence of the end-of-message code illustrated in FIG. 2 on the circuit 116 and in response thereto actuates the detector pass control circuit 126 if that circuit had been previously enabled by a grant of access message from processor 17. A signal from the circuit 126 is coupled through OR gate 121 and format generator 122 for converting the trailing ONE in that code to a ZERO. The ZERO bit preceding the ONE in the end-of-message code provides delay, as does the first ZERO in the SRS code, to permit completion of secondary network operation in time to make the overwriting in the correct bit position of the code.

Assuming that the station has not seized control, an SOM detector 127 supplies an enabling input to the ICSR 112 in response to the detection of a start-of-message code. Thereafter, during the message field for the WHERE-TO code, a WHERE-TO detector (WTDT) 129 looks for the address code of the station teletypewriter 13 which is illustrated in FIG. 5B. Upon detection of that code, a WHERE-TO flip-flop 130 is actuated and its output is utilized as an enabling signal in conjunction with outputs of the ICSR register 112 for programming the remainder of the secondary network input signal operation.

A WHERE-FROM register (WFHR) 131 is gated by the ICSR register 112 to receive signals during the WHERE-FROM field of the message format. The WHERE-FROM information is retained in the register 131 until such time as it is needed for gating out in the WHERE-TO field of an outgoing reply message.

An operating code detector (OPDT) 132 is gated on by the ICSR 112 during the operation code field of the incoming message header to look for one of a predetermined set of operation codes for further controlling secondary network operation. Detector circuit flip-flops 133 and 137 through 142 for indicating a limited number of such codes in one operation code set are illustrated in FIG. 5. These are the are-you-busy code RYB, the transfer-to-business-machine code TBM and its associated send-ready-to-receive code TSR, the binary control function code BCF, the enter codes EOR and EWR, and the foreign received code NOP. The detection of an operation code in the predetermined set actuates a corresponding flip-flop for establishing the necessary control signal. Circuits not shown utilize the control signals in accordance with well-known logic circuit design for carrying out the corresponding operations described.

Detection of the RYB code produces no response if a station is busy. If it is not busy the RYB flip-flop 141 output is used to select a ready code for outpulsing from the operation code generator 170. That ready code is subsequently incorporated into a rely message, as will be described, when the station has obtained loop control.

During the data field of an incoming message, the ICSR 112 enables a double rank input buffer register to receive the data. The input rank IBIR 136 is enabled first, and then its content is steered to appropriate circuits for utilization in accordance with the detected operation code. During transfer of data out of IBIR 136 for utilization, additional bits of the data field are advantageously brought into the buffer register. The codes TBM, BCF, and TSR cause the contents of IBIR 136 to be transferred to an input buffer output rank IBOR 147 for further utilization. Should either of the registers 136 and 147 overflow, the condition is detected by flip-flops 146 and 148 to produce appropriate alarms.

A BCF code control signal from flip-flop 137 enables a BCF detector 144 to examine the date in IBOR 147 for the presence of a code in an extended operation code set. One such extended code is the aforementioned grant of access which produces a detector output on a circuit 125 to enable the circuit 126 as previously noted. After the detector 144 has been operated, it is reset and awaits further data.

The TBM and TSR codes cause the contents of IBOR 147 to be further transferred to the teletypewriter 13. The TSR code causes the contents of IBOR 147 to be moved to the teletypewriter 13 with the further requirement that the sending station be advised when the teletypewriter 13 is ready to receive another message. However, the TBM code simply permits transfer of the data to the business machine, i.e. teletypewriter 13 or other machine used at the station, without the requirement for future free time indication. The TBM code might be used, for example, where the station business machine is disk file 12.

It is sometimes useful for one station to direct another station to send a message to a third station. Such a situation arises in a data processing system where a disk file or a plotter may not have an associated teletypewriter that can be used to formulate an appropriate message header with addresses and operation code. To this end the enter codes EWR and EOR permit a sending station to supply address and operation code information to such a receiving station to be later associated by the receiving station with the latter's output data for a third station. The detection of EWR AND EOR cause the contents of the buffer IBIR 136 to be diverted to dedicated registers instead of going to IBOR 147. A gate 149 is enabled by the output of the EWR flip-flop 138 to steer data field information from IBIR 136 through an OR gate 151 to a WHERE-TO holding register WTHR 153. A gate 150 is enabled by the output of the EOR flip-flop 139 to steer data to an operation code holding register OPHR 156.

At least one station in loop 11 operates on an operation code set which is different from the described set. If the operation code detector 132 should not detect any of the aforementioned codes of the predetermined code set in he appropriate field of the message, it provides an output signal to an NOP flip-flop 142. The actuation must be the latter flip-flop is interpreted to mean that the incoming message is utilizing a foreign operation code set which must be referred to memory for translation. Accordingly, the NOP flip-flop 142 couples the contents of the detector 132 to a read-only memory 143 which contains data correlating all of the possible operation code sets in the loop. Memory 143 responds to the foreign code from detector 132 in a well-known manner for table look-up operations by reading out the corresponding code for the secondary network of FIG. 5 to overwrite the contents of the detector 132. These table look-up operations are being carried forward at the same time that the IBIR register 136 is receiving signals in the data field of the message.

A teletypewriter rate generator 157 is responsive to the time-zero output of timing level generator 111 for generating a clock signal at the appropriate times for the teletypewriter 13 to permit that apparatus to receive at its own bit rate information stored in the input buffers 136 and 147 at the bit rate of loop circuit 20. The same teletypewriter clock rate is utilized for coupling the output of the teletypewriter 13 to the input rank OBIR 158 of an output double rank buffer register.

Output from teletypewriter 13 is transferred through an output couple rank buffer register including registers 158 and 159. If register overflow should occur, it is detected, as on the input side, by the OIFL flip-flop 160 and the OOFL flip-flop 161 for actuating an appropriate alarm. The input rank OBIR 158 is arranged for transferring address and operation code signals to registers 153 and 156 and then transferring data to the output rank register OBOR 159. However, in order to make maximum use of the buffer capacity and still retain a high level of flexibility in putting together a total message, the station secondary network of FIGS. 5A and 5B incorporates circuits to allow address and operation code information generated by teletypewriter 13 to be separately handled. To utilize this apparatus, an operator precedes the WHERE-TO address and the operation code that he generates by an escape code ESC. That code is recognized by a detector 166 which actuates a two-character shift register 167. The latter register opens gates 162 and 163 in that order to transfer the address and operation code character bits to registers WTHR 153 and OPHR 156, respectively, as the buffer OBIR 158 is filled with data field bits at the teletypewriter bit rate. The full data field is thereafter transferred under the control of output control shift register OSCR 113 to buffer OBOR 159 to await assembly into a full message format by register OSCR 113.

Upon actuation of the pass control circuit 126, as previously mentioned, the trailing ONE in the EOM+1 ONE in the EOM+1 code is converted to a ZERO; and the output of a start-of-message code generator 168 is coupled to the OR gate 121 for outpulsing. As the last bit of that code is pulsed out, the OCSR 113 is actuated and immediately begins to assemble the message header and appropriate data in the format of FIG. 3 for outpulsing at the loop bit rate through the OR gate 121 and the format generator 122 to the primary network by way of circuit 108. A WHERE-TO code is gated out from the WFHR register if the outgoing message is a reply, or from the WTHR register if the outgoing message is a new message. The next step in the sequence is to actuate a WHERE-FROM generator 169 to gate out the address code of the illustrated station. The OPHR register 156 or the OPGN 170 is then actuated to supply the header operation code, and then the contents of the output data buffer OBOR 159 are gated out, followed by the usual end-of-message code from a further generator 171. If an operation code of an extended set is employed, it is provided in the data field by the operator of teletypewriter 13.

When the secondary network of FIGS. 5A and 5B is employed with a supervisory station in a loop, the secondary network circuits are utilized in performance of supervisory functions. To this end the SYN and SRS codes depicted in FIG. 2 are selectably supplied in a supervisory station by an SYN GN generator 197 and an SRS GN generator 198. Outputs of those generators are gated out to OR gate 121 by processor 17 programmed control signals.

Following the end-of-message code, a succeeding station on the loop circuit 20 is able to operate in the same fashion already described to seize control of the loop circuit 20 for transmitting its messages. In this manner loop circuit 20 is maintained full of useful information at all times when there is any transmission to be done by any station on the loop circuit because there are not station-dedicated time slots for data field transmission. Clocking information is always available on the circuit 20 so resynchronization delays are not required on each message. A common transmission facility is never held open and unavailable to other stations while a response from an addressee station is awaited, and there is no requirement to await the expiration of a fixed message time because each station determines its own transmission time when working. A station which does not require transmission time simply remains passive but synchronized, and it is not required to take any action when the control-passing, end-of-message code passes through its primary network.

What we claim is:

1. In combination, a closed transmission loop and plural stations coupled thereto for transmitting information signals and operation codes among such stations, means in each said station responsive to a predetermined one of said codes on said loop to initiate station transmission on to said loop, and means inserting said predetermined code as the final portion of such transmission.

2. The combination in accordance with claim 1 in which means in each of said stations restrict transmission in said loop to a single predetermined direction around the loop.

3. The combination in accordance with claim 1 in which said loop is closed at all times with signal present thereon, and each of said stations includes means responsive to said predetermined code for overwriting said loop signals to realize station transmission on to said loop.

4. The combination in accordance with claim 1 in which said code comprises a predetermined configuration of signals which it is impossible to produce in said information signals, and followed by a single information signal bit of a predetermined type, and said initiating means comprises means responsive to said single bit converting such bit in said loop to a single information bit of a second predetermined type for inhibiting transmission operations in other ones of said stations.

5. The combination in accordance with claim 1 in which one of said stations is a supervising station and includes means placing a service request scan code on said loop for polling said stations to determine which ones are in need of service, and said supervisory station includes means enabling selected plural ones of said stations to have access to said loop.

6. The combination in accordance with claim 1 in which
at least two of said stations are constructed to operate in response to different operation code sets,
one of said stations is a supervisory station having storage means and data processing means,
said storage means includes table look-up data interrelating said operation code sets, and
each of said stations includes means responsive to an operation code in an incoming message from said loop requesting said supervisory station to translate such operation code into a code for such station.

7. The combination in accordance with claim 1 in which
at least two of said stations operate in response to different but correlative operation code sets, and
each of said stations includes
means responsive to an operation code in an incoming message and detecting the presence of a foreign operation code,
memory means containing table look-up data correlating said operation code sets to one another, and
means cooperating with said memory means and responsive to the detection of a foreign operation code for translating the latter code to an operation code for such station.

8. The combination in accordance with claim 1 which comprises in addition
at least one additional closed transmission loop of the same type as the first-mentioned closed transmission loop,
one station in each of said loops is a supervisory station, and
means providing communication among said closed transmission loops through at least one of said supervisory stations.

9. The combination in accordance with claim 1 in which at least one of said stations includes
a register,
means responsive to a further one of said operation codes entering a predetermined part, specified by such code, of an incoming message including such code in said register, and
means incorporating the contents of such register in an outgoing message from such station.

10 The combination in accordance with claim 1 in which
said transmission loop includes a predetermined phase delay for signals transmitted completely around the loop, and
a digital delay pad is included in said loop to compensate for said delay.

11. The combination in accordance with claim 10 in which said pad includes
storage means through which said signals are passed transmission around said loop,
means coupling said signals into said storage means in the signal phase at an input to said pad, and
means coupling said signals out of said storage means in the signal phase at an output of said pad.

12. The combination in accordance with claim 1 in which
at least one signal repeater is included in said loop between adjacent stations thereon for regenerating said information signals, and
means in said repeater recover clock from said signals for controlling operation of said repeater.

13. The combination in accordance with claim 12 in which
said signals are transmitted at a predetermined information bit rate, and
said loop includes signal transmission circuit means having a signal transmission frequency bandwidth which is much less than said bit rate.

14. The combination in accordance with claim 1 in which
interface network means couple each of said stations to said loop for maintaining continuous signal transmission in said loop in the absence of transmission from any of said stations.

15. The combination in accordance with claim 14 in which said interface network means comprises
primary network means including
clock recovery means generating a clocking signal in response to said continuous signal transmission, and
loop signal regenerating means responsive to said clock signal for maintaining said continuous signal transmission through said network means, and
secondary network means comprising
means monitoring said continuous signal transmission, and
means responsive to said code transmitting information signals to said loop by overwriting said continuous signal transmission.

16. The combination in accordance with claim 15 in which said clock recovery means includes
resonant means stabilizing the frequency of said clocking signal.

17. The combination in accordance with claim 15 in which said interface network means at one of said stations comprises
two of said primary network means,
a digital phase delay pad means coupling said signals between said two primary network means, said pad including
means coupling said signals into said pad means from a first of said two primary network means under control of clock signal recovered in said first network means, and
means coupling said signals from said pad means to a second of said two primary network means under control of clock signal recovered in said second network means, and
said secondary network means at said one station including means coupling its monitoring means to be responsive to said signals in said first primary network means and means coupling its overwriting signals to said second primary network means.

18. The combination in accordance with claim 17 in which
means are provided to supply a continuous train of signals to said loop through said first primary network.

19. The combination in accordance with claim 15 in which
a common power supply is provided for all of said primary networks to supply operating energy thereto by way of loop circuit means shared with said information signal.

REEXAMINATION CERTIFICATE (146th)

United States Patent [19]

Farmer et al.

[11] B1 3,597,549

[45] Certificate Issued Dec. 6, 1983

[54] HIGH SPEED DATA COMMUNICATION SYSTEM

[75] Inventors: Wayne D. Farmer, Madison Township, Middlesex County; Edmunde E. Newhall, Rumson, both of N.J.

[73] Assignee: Bell Telephone Laboratories, Incorporated, Murray Hill, N.J.

Reexamination Request:
No. 90/000,242, Aug. 11, 1982

Reexamination Certificate for:

| | |
|---|---|
| Patent No.: | **3,597,549** |
| Issued: | **Aug. 3, 1971** |
| Appl. No.: | **842,581** |
| Filed: | **Jul. 17, 1969** |

[51] Int. Cl.[3] .................... H04J 3/08

[52] U.S. Cl. .................... 370/88; 370/90

[58] Field of Search .................... 370/90, 86, 89, 88, 370/97

[56] References Cited

U.S. PATENT DOCUMENTS

| | | | |
|---|---|---|---|
| 3,456,242 | 7/1969 | Lubkin et al. | 370/86 |
| 3,519,750 | 7/1970 | Beresin et al. | 370/86 |
| 4,293,948 | 10/1981 | Soderblom | 370/90 |

*Primary Examiner*—Douglas W. Olms

[57] ABSTRACT

A common continuously closed loop transmission line links all stations in a multistation network, and continuous bipolar bit signal is maintained thereon for providing station clock recovery. A station transmits by overwriting the loop signal with the station outgoing message, and an end-of-message code on the loop is followed by a binary ONE bit. A station wishing to transmit, and recognizing the latter code, coverts the ONE to a ZERO to signify to down-line stations that it has seized control; and it immediately transmits its message followed by the end-of-message code plus a ONE. Control of the loop is thus similarly passed around the loop to utilize every time slot as long as any station wants to transmit.

REEXAMINATION CERTIFICATE ISSUED UNDER 35 U.S.C. 307.

HIGH SPEED DATA COMMUNICATION SYSTEM

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-19 is confirmed.

New claims 20-28 are added and determined to be patentable.

*20. In combination,*

*a closed transmission loop and plural stations coupled thereto for transmitting information signals and operation codes among such stations,*

*means in each said station responsive to a predetermined one of said codes on said loop to initiate a time-continuous sequence of message signal transmission onto said loop, and*

*means inserting said predetermined code as the final portion of such transmission.*

*21. In combination,*

*a closed transmission loop and plural stations coupled thereto for transmitting information signals and operation codes among such stations,*

*means in each said stations, responsive to a predetermined one of said codes on said loop, to modify said one code, transmit the modified code, and initiate station transmission onto said loop following the modified code, and*

*means inserting said predetermined code as the final portion of such transmission.*

*22. The combination in accordance with claim 21 in which said modifying and initiating means include*

*means for coupling said each station to said loop without interrupting said loop.*

*23. The combination in accordance with claim 21 in which said modifying and initiating means include*

*means for effecting said station transmission as a time-continuous sequence of message signal transmission extending to include said final portion thereof with said predetermined code.*

*24. In combination,*

*a closed transmission loop and plural stations coupled thereto for transmitting information signals and operation codes among such stations,*

*means in each said station responsive to a predetermined one of said codes on said loop to initiate station transmission onto said loop without interrupting said loop, and*

*means inserting said predetermined code as the final portion of such transmission.*

*25. In combination,*

*a closed transmission loop and plural stations coupled thereto for transmitting information signals and operation codes among such stations,*

*means in each said station responsive to a predetermined one of said codes on said loop to initiate station transmission onto said loop, said initiating means including means for combinatorially interacting a local information signal at said each station with an incoming signal on said loop to force outgoing loop signal states to conform to local information signal states, and*

*means inserting said predetermined code as the final portion of such transmission.*

*26. In combination,*

*a closed transmission loop and plural stations coupled thereto for transmitting information signals and operation codes among such stations, said loop including means for recirculating information signals from a sending station around said loop back to said sending station,*

*means in each said station responsive to a predetermined one of said codes on said loop to initiate station transmission onto said loop, and*

*means inserting said predetermined code as the final portion of such transmission.*

*27. In combination,*

*a closed transmission loop and plural stations coupled thereto for transmitting information signals and operation codes among such stations,*

*means in each said station responsive to a predetermined one of said codes on said loop to initiate station transmission addressed to any other of said plural stations on said loop, and*

*means inserting said predetermined code as the final portion of such transmission.*

*28. In combination,*

*a closed transmission loop and plural stations coupled thereto for transmitting information signals and operation codes among such stations,*

*a first one of said stations including means for coupling said loop to an additional closed transmission loop,*

*means in each of said plural stations responsive to a predetermined one of said codes on the first-mentioned loop to initiate station transmission onto said first-mentioned loop in a predetermined direction to at least a second one of said stations that is, in said one direction, beyond said first station including said coupling means, and*

*means inserting said predetermined code as the final portion of such transmission.*

* * * * *